United States Patent [19]
Vassiliou et al.

[11] Patent Number: 5,850,622
[45] Date of Patent: Dec. 15, 1998

[54] TIME-FREQUENCY PROCESSING AND ANALYSIS OF SEISMIC DATA USING VERY SHORT-TIME FOURIER TRANSFORMS

[75] Inventors: Anthony A. Vassiliou; Paul Garossino, both of Tulsa, Okla.

[73] Assignee: Amoco Corporation, Chicago, Ill.

[21] Appl. No.: 748,256

[22] Filed: Nov. 8, 1996

[51] Int. Cl.⁶ .................................................. G06F 19/00
[52] U.S. Cl. ............................................. 702/17; 367/46
[58] Field of Search ......................... 702/14, 17; 367/46, 367/44, 45, 52

[56] References Cited

U.S. PATENT DOCUMENTS

5,473,759   12/1995   Slaney et al. .

OTHER PUBLICATIONS

Hanna, M.T., "Velocity filters for multiple interference attenuation in geophysical array data", IEEE Transactions on Geoscience and Remote Sensing, vol. 26, Iss. 6, pp. 741–748, Nov. 1988.

Choudhury, A.A., et al., "Multidimensional discrete filtering using combined discrete Fourier transform and linear difference equation filter methos", IEEE International Symposium on Circuits and Systems, May 8–11, 1989, pp. 1479–1482.

Chen, Chih–Ming, et al., "Velocity Filters for Multiple Interferences in Two–Dimensional Geophysical Data", IEEE Transactions on Geoscience and Remote Sensing, vol. 29, Iss. 4, Jul. 1991, pp. 563–570.

Madisetti, Vijay, et al., "Seismic Migration Algorithms Using the FFT Approach on the NCUBE Multiprocessor", ICASSP '88: Acoustics, Speech & Signal Processing Conference, Feb. 1988, pp. 894–897.

Rioul & Vetterli "Waveletsand Signal Processing", IEEE Signal Processing Magazine, Oct. 1991, pp. 14–21.

Chakraborty & Okaya "Frequency–time decomposition of seismic data using wavlet–based methods", Geophysics, vol. 60, No. 6 (Nov–Dec 1995), pp. 1906–1916.

Yilmaz Seismic Data Processing, Society of Exploration Geophysicists, 1987, Chapters 1.5 and 1.6.

Okaya et a. "Removing vibrator–induced correlation artifacts by filtering in frequency–uncorrelated time space", Geophysics, vol. 57, No. 7 (Jul. 1992) pp. 916–926.

*Primary Examiner*—Donald E. McElheny, Jr.
*Attorney, Agent, or Firm*—James A. Gabala; Robert E. Sloat

[57] ABSTRACT

The present invention relates generally to method of seismic data processing which provides a superior method of removing or attenuating some forms of seismic noise and can also be used as a basis for seismic attribute analysis and automatic trace editing. In particular, the present invention is directed toward the application of a Very Short-Time Fourier Transform (VSTFT) to seismic data, coupled with a novel approach to organizing and/or displaying the transformed data, so as to provide highly localized frequency analyses of seismic reflection events. The present invention utilizes a very great number of short overlapping Fourier transform windows, together with a Gaussian weight or taper function, to produce a plurality of near single-frequency "sub-band" traces for each seismic trace so analyzed. Although the present invention can be applied to a single seismic trace, it is preferably applied to a collection of seismic traces that are spatially related. Among the many uses of the transformed seismic data are selective removal of coherent noise events, analysis for seismic attributes related to subsurface features of interest, seismic trace creation by interpolation, and automatic identification and removal of noisy seismic traces.

56 Claims, 7 Drawing Sheets

TIME-FREQUENCY PROCESSING AND ANALYSIS OF SEISMIC DATA USING VERY SHORT-TIME FOURIER TRANSFORMS

FIELD OF THE INVENTION

The present invention is directed generally toward a method of attenuating noise in seismic data using a moving-window Very Short-Time Fourier Transform (VSTFT) in combination with a novel method of organizing and displaying the seismic records so transformed. It is also directed toward using the VSTFT to uncover seismic attributes that can be correlated with subsurface structural and stratigraphic features of interest, thereby providing a quantitative value that can be mapped by the explorationist and used to predict subsurface hydrocarbon or other mineral accumulations. A further goal of the present invention is to utilize the VSTFT to provide a means for automatic trace editing of noisy seismic data based on statistical criteria. Additionally, the present invention may be used to provide a means of interpolating new traces into a collection of spatially related seismic traces. Finally, the VSTFT is shown to be just one of many discrete short-time data transforms that can be used to process and interpret geophysical time series in general, geophysical time series being those time series wherein each data sample is characterized by a travel time, a position, and an amplitude.

BACKGROUND

By most standards exploration geophysics is a relatively young science, with some of the earliest work in the subject area dating back to the 1920's and the renowned CMP approach dating from only the 1950's. In the years since its genesis, however, it has become the oil industry's preeminent approach to finding subsurface petroleum deposits. Although exploration geophysics generally encompasses the three broad subject areas of gravity, magnetics, and seismic, today it is the seismic method that dominates almost to the point of exclusion of the other disciplines. In fact, a simple count of the number of seismic crews in the field has become one accepted measure of the health of the entire oil industry.

A seismic survey represents an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the land above the geologic structure of interest. Each time the source is detonated, it is recorded at a great many locations on the surface of the earth. Multiple explosion/recording combinations are then combined to create a near continuous profile of the subsurface that can extend for many miles. In a two-dimensional (2-D) seismic survey, the recording locations are generally laid out along a straight line, whereas in a three-dimensional (3-D) survey the recording locations are distributed across the surface in a grid pattern. In simplest terms, a 2-D seismic line can be thought of as giving a cross sectional picture of the earth layers as they exist directly beneath the recording locations. A 3-D survey produces a data "cube" or volume that is, at least conceptually, a 3-D picture of the subsurface that lies beneath the survey area. Note that it is possible to extract individual 2-D line surveys from within a 3-D data volume.

A seismic survey is composed of a very large number of individual seismic recordings or traces. In a typical 2-D survey, there will usually be several tens of thousands of traces, whereas in a 3-D survey the number of individual traces may run into the multiple millions of traces. A seismic trace is a digital recording of the sound energy reflecting back from inhomogeneities in the subsurface, a partial reflection occurring each time there is a change in the acoustic impedance of the subsurface materials. The digital samples are usually acquired at 0.004 second (4 millisecond) intervals, although 2 millisecond and 1 millisecond intervals are also common. Thus, each sample in a seismic trace is associated with a travel time, a two-way travel time in the case of reflected energy. Further, the surface position of every trace in a seismic survey is carefully recorded and is generally made a part of the trace itself (as part of the trace header information). This allows the seismic information contained within the traces to be later correlated with specific subsurface locations, thereby providing a means for posting and contouring seismic data, and attributes extracted therefrom, on a map (i.e., "mapping").

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features such as faults, folds, and anticlines. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets. In brief, seismic data provides some of the best subsurface structural and stratigraphic information that is available, short of drilling a well.

For all of its potential, seismic data are subject to a wide variety of noise related problems that can and do limit its usefulness. Broadly speaking, noise found in seismic traces is either incoherent or coherent. Incoherent ambient noise, or uncorrelated "white" noise, is ubiquitous and is generally greatly attenuated through the simple expedient of stacking, although extremely large individual data values ("spikes") and "bad" traces often need special attention. Coherent, or correlated, noise on the other hand cannot usually be so readily eliminated. Some common examples of coherent noise include multiple reflections, ground roll, air waves, guided waves, sideswipe, cable noise and 60 hertz power line noise. From the standpoint of seismic interpretation, potentially the most dangerous noise is coherent noise, because coherent noise can create false structure and other anomalies on the seismic section which may create the appearance of viable exploration prospects. Coherent noise may not be significantly attenuated by stacking, hence alternative approaches have been developed by necessity.

Of the many approaches to attenuating coherent noise, transform based methods are some of the most important and useful. A 2-D transform method is one that operates on several seismic traces simultaneously. The most popular of the 2-D transform methods is the 2-D Fourier transform (or "f-k" transform), although there are many others. The general approach to noise reduction is roughly the same for any of the 2-D transform methods. First, seismic data containing coherent noise are transformed to an alternative domain in the hope that coherent noise events will be compactly represented there. If that assumption is correct, and if the noise energy can be located and isolated in the transform domain, it is excised from the transformed data by setting the values in the region corresponding to the noise energy equal to zero or some other minimal value, i.e., "muting" the data in the transform domain. Finally, the transformed data, now hopefully without the coherent noise energy, are then inverse transformed to return them to the time and offset (i.e., untransformed or "x-t") domain. If all has gone well, the coherent noise has been removed or greatly attenuated.

Operationally, 2-D transforms are implemented as follows. First, a collection of related seismic traces are brought together within a computer. These traces are "related" in the sense that they might be, by way of example, traces from a single shot record, a common mid-point (CMP) gather, a constant offset section, a vertical seismic profile (VSP), or, occasionally, an entire stacked seismic section. It is important for transform purposes that the spatial relationships of the input traces be maintained within the computer. That is, the traces should be organized within the computer in terms of increasing offset, surface location, or some other ordering that reflects the physical layout of their acquisition.

After the related traces are brought together, the transform of choice is applied to each trace separately in the time direction, producing as output the same number of new traces containing transformed data. These new traces are then "mixed" together by applying the transform separately at each time point down the trace, i.e., in the "offset" direction, one number being contributed from each of the individually transformed traces. It should be noted that the same result would be obtained if the traces had been "mixed" together first followed by individual trace transforms.

The output from the last step above represents the completed 2-D transformation of the seismic data. The transformed data may now optionally be exhibited in hard copy form (printed or plotted) or displayed on a computer monitor. The transformed traces might either viewed in black-and-white or color, with color displays being generally preferred and more useful, color displays being generally interpreted herein to also include grey-scale intensity plots. If the data are displayed, a seismic processor or interpreter can then review the transform results for purposes of designing mutes, examining attributes, etc. The display of the transformed data is optional because, in many cases, the input data are simply transformed within the computer, automatically processed within the transform domain according to some predetermined computational strategy, then inverse transformed.

After the transformed data have been analyzed and/or modified, the inverse transform is applied. The inverse transform is applied first to the individual traces in the "time" direction and then at each time point in the "offset" direction, or vice versa. Once again, the order in which the inverse transform is applied is immaterial. If the data have not been modified while in the transform domain, application of the 2-D inverse transform should exactly reconstruct the original data traces. If, on the other hand, the data have been edited while in the transform domain, the reconstituted data will be changed, hopefully for the better.

Speaking now exclusively of the 2-D Fourier transform, this transform method converts the time and offset axes of the original seismic data into units of frequency and wave number, also called the f-k domain. Although the input data from a seismic trace are exclusively real valued, the output from the Fourier transform consists of complex data values of the form "A+Bi", where "i"represents the "imaginary" number or the square root of a negative one. It is well known that the expression A+Bi may equivalently written as: $A+Bi=re^{i\theta}$, where, $$r = |A + Bi| = \sqrt{A^2 + B^2},$$

and $$\theta = \tan^{-1}\left(\frac{B}{A}\right).$$

The quantity $\theta$ is known as the phase angle (or just the "phase") of the complex quantity A+Bi, the quantity "r" its magnitude, and the expression |A+Bi| is the mathematical notation for the magnitude of a complex valued quantity, also called its absolute value.

The 2-D Fourier transform is often used in seismic processing as a "dip filter" to eliminate dipping events of a given slope from seismic data. Seismic events that have a linear dip will be represented as a single point in the f-k domain. Thus, at least in theory, to eliminate an event with linear dip only a specific point need be muted in the f-k domain, although in practice a region around that point is usually eliminated.

Unfortunately, all too often traditional 2-D transform techniques in general, and the 2-D Fourier transform in particular, suffer from problems that keep them from being as effective as the theory might lead one to expect. For example, a threshold problem that confronts a user of this technology is that of locating the coherent noise event in the transform domain. Seismic events that are obvious in the x-t (i.e., "offset-time" or untransformed) domain may be difficult to locate in the f-k domain. Certainly, there are theoretical results that provide some guidance as to where to look in the transform domain but, practically speaking, locating a particular noise event may still be a problem.

Additionally, although the theory predicts that certain noise configurations will be compactly represented after transformation, in practice things are seldom that simple. For example, the energy associated with a seismic event that dips linearly is, at least theoretically, represented in the frequency-wave number domain as a single point. Of course, very few seismic events have precisely linear dip (most exhibit at least some minimal amount of residual hyperbolic moveout) and, to the extent that the data do not precisely conform to this model, the event will be found "smeared" in the f-k domain and its removal may prove to be problematic.

Another problem arises if the unwanted seismic event dips too steeply. In that case, the reflector may be spatially aliased, and it will appear in the f-k domain at an incorrect apparent dip. The net result is that the unwary interpreter or processor who is attempting to remove a seismic event with a specific dip may "miss" all or part of its energy. The exact circumstances which give rise to spatial aliasing are well known in the art and are a function of center frequency of seismic event and the trace spacing. For a discussion of spatial aliasing, see Chapter 1.6 of *Seismic Data Processing*, Ozdogan Yilmaz, Society of Exploration Geophysicists, 1987, the disclosure of which is incorporated herein by reference.

In addition, whole-trace based transforms implicitly assume that the seismic time series on each trace is stationary, that is, that its energy level remains constant throughout its length. However, very often stationarity is not present. For example, it is well known that the seismic signal tends to "fade away" at later recording times because the reflected signal has traveled much farther before reaching a receiver. Short window AGC (automatic gain control) and other trace scaling techniques can be used to force the data to be roughly stationary, but that step would be in opposition to the modem trend toward "true" or relative-amplitude processing. This lack of stationarity in the data can be reflected in unpredictable ways in the f-k domain.

Finally, the time-frequency localization of a whole trace Fourier transform is poor. This means that transform methods that use the entire seismic trace ignore the changing character of individual seismic reflectors. There is, for example, a continual loss of higher signal frequencies at later arrival times, a fact that will not be easily observed in a whole-trace Fourier transform. In addition, the changing short-term phase and amplitude characteristics of an individual reflector may be an important predictor of hydrocarbon accumulations. One last consequence of the poor time-frequency localization is that when dipping events are removed with an f-k transform, the effect of that removal is propagated throughout the entire assemblage of traces. Localized removal of an unwanted dipping event is just not possible with a whole-trace Fourier transform.

In an effort to overcome some of the limitations with the full-trace Fourier transform, use has been made of the short time Fourier transform (STFT). The STFT is so called because, rather than operating on the entire trace with a single transform, it utilizes a series of relatively short overlapping windows that are separately transformed using a discrete one-dimensional (1-D) Fourier transform. The length of the window and the amount of overlap varies with the particular application, but conventional wisdom has always been that very short STFTs, for example 32 or 64 samples long, are too noisy to be useful. (See, for example, Okaya, Karageorgi, McEvilly, and Malin, *Removing vibrator-induced correlation artifacts by filtering in frequency-uncorrelated time space*, Geophysics, Vol. 57, No. 7, p. 916–926, at page 918, wherein a transform of length 250 samples is described as being an application of a STFT).

The STFT obviates one problem with the traditional whole-trace Fourier transform in that it can provide a more local analysis of a seismic event, a property that suggests new applications that were not feasible with a whole trace transform. Depending on the length and position of the window, a conventional STFT analysis window may include only a few seismic events, thereby yielding relatively localized analyses of the seismic trace at a particular time. This localized event analysis might be in the form of a short-window amplitude spectrum or the corresponding phase spectrum of the event, the phase being a component of seismic data that is not generally as well understood as the amplitude, but potentially of critical importance in some exploration plays. Of course, a STFT that is too long will exhibit the same lack of localization as the whole-trace Fourier transform. In more particular, since a typical exploration target reflector of interest may only be 100milliseconds (e.g., 25 samples at a 4 millisecond sample rate) in length or even shorter, a conventional STFT window would normally be much too long to allow the seismic interpreter to focus on the properties of this single event.

The STFT is also preferred over the whole-trace Fourier transform when the data exhibit non-stationarity. Since the STFT window contains only a portion of the entire seismic trace, it is less plagued by problems of stationarity in the data. Obviously, longer STFT windows will be more susceptible to this problem, with shorter windows having an advantage over longer ones.

Finally, another advantage of the STFT becomes apparent when an analysis of the phase of an event, or some other reflector attribute, is required. It is well known to those skilled in the geophysical exploration arts that the localized analysis of seismic events has become increasingly important in exploration settings in recent years, as explorationists attempt to find and map the subtle variations in reflector character that might signal an important change in reservoir lithology or the presence of hydrocarbons. In the instance that a localized analysis is desired, a whole trace Fourier transform is not favored because it does not yield a localized estimate of the phase of a seismic event. On the other hand, a conventional STFT utilizes a shorter window, but still requires a window that so long that it typically encompasses multiple seismic reflectors, thus any estimate of the phase thereby obtained is some average of the phase from several events, rather than the response of the single target reflector. Further, conventional STFT analyses and displays are not well suited for tracking the variations in reflector phase that might occur at different points in a seismic section or volume: changes in phase that might be of substantial exploration importance.

The STFT is a useful tool that has traditionally only been applied to the analysis of a single seismic trace, wherein it has been used to locate and eliminate seismic events based on their changing frequency content with time, not their dip. (See, for example, Chakraborty and Okaya, *Frequency-time decomposition of seismic data using wavelet-based methods*, Geophysics, Vol. 60, No. 6, pp. 1906–1916). However, the present inventors have discovered a method of using a very short time Fourier transform—shorter in length than was heretofore felt to be possible—in a multi-trace analysis and display that overcomes many of the short comings of the conventional STFT. Further, the general approach disclosed herein provides novel methods of, among others, eliminating coherent noise based on either its changing frequency content with time or its dip, automatically identifying and removing bad traces, generating localized seismic attribute values, and creating new seismic traces by interpolation.

Heretofore, as is well known in the seismic processing and seismic interpretation arts, there has been a need for a frequency domain based method of seismic display and analysis which does not suffer from the problems inherent in a whole trace discrete Fourier transform or a conventional STFT. Accordingly, it should now be recognized, as was recognized by the present inventors, that there exists, and has existed for some time, a very real need for a method of seismic data processing that would address and solve the above-described problems.

In more particular, the present inventors have discovered a novel way of obtaining useful information from seismic data using a very short time Fourier transform (VSTFT). This approach is so called to distinguish it from the prior art wherein the ability to secure useful information from very short Fourier transform analysis windows has not yet been appreciated. Using analysis windows as short as 16 or 32 samples, together with successive sliding windows that differ by only a few samples, the present inventors have determined that if the transformed data are displayed in a novel fashion, many of the previous limitations of the STFT can be overcome and its usefulness enhanced. Further, the invention disclosed herein is made even more useful if the proper weight function is applied to the data within the analysis window prior to transformation. Finally, by applying the VSTFT to traces that are spatially related and maintaining that relationship when the sub-band panels are displayed, the information contained within the transformed traces displayed thereby is further augmented.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to one aspect of the present invention there has been provided a system for processing seismic data to attenuate or remove coherent and other noise types, wherein a VSTFT (very short time Fourier transform) is applied to a plurality of related seismic traces to transform said traces to the FT (frequency-time) domain, the data are edited after being so transformed, and the edited traces are then inverse transformed.

As a first step, a collection of "related" seismic traces are assembled. These traces might be, for purposes of illustration only, one or more shot records, a constant offset gather, a CMP gather, a VSP survey, a 2-D seismic line, a 2-D seismic line extracted from a 3-D seismic survey, or the traces in a 3-D survey. More generally, the invention disclosed herein can be used to process and interpret any spatially related collection of geophysical time series, geophysical time series being those time series wherein each data sample is characterized by a travel time, a position, and an amplitude. Whatever the choice, the invention disclosed herein is most effective when applied to a group of seismic traces that have some underlying spatial relationship. Again for purposes of illustration only, the discussion that follows will be couched in terms of a shot record, although any assembled group of spatially related traces could be used equally well.

Next, a sliding window length is chosen, said sliding window length to be represented by the symbol "L" hereinafter. For purposes of computational efficiency, this window length, when measured in samples, is usually restricted to be an integer power of 2 (e.g., 16, 32, 64, 128, etc.). This limitation allows the highly efficient Fast Fourier Transform (FFT) calculation algorithm to be utilized, rather than a somewhat less efficient mixed radix Fourier transform or a much less efficient general discrete Fourier transform. However, in the discussion that follows, it is understood by those skilled in the art that whenever an FFT is called for, a discrete Fourier transform, or some mixed radix variant, could have been used instead, and, indeed, would have been necessary if the chosen window length were not an integer power of 2.

A weight function is next selected. The purpose of the weight function is to taper or smooth the data within the sliding window, thereby lessening the frequency-domain distortions that can arise with a "box-car" type analysis window. The preferred weighing function is Gaussian in shape and is in many ways optimal for this application. That being said, note that many other weight functions could also potentially be used.

For each trace in the shot record, a separate auxiliary data storage area in the form of sub-band traces must be prepared, the dimensions of which are dependant upon the length of each input trace, "N" hereinafter, and the length of the sliding analysis window. Further, this same amount of storage must be provided for each trace in the shot record. The auxiliary data storage area might be, by way of example only, computer RAM, a disk file, or even magnetic tape. The auxiliary storage area (sub-band traces) is used to store the calculated Fourier coefficient values as is described in greater detail below.

Beginning with the first trace in the shot record, the sliding window is positioned initially at the top of the trace. The weight function is applied to the data within the window and the FFT is calculated. The resulting complex transformed values are then stored in the sub-band traces that have been set aside for the first trace, one complex value per trace. The storage location of each complex value in the sub-band trace is usually chosen to be the same as the time (or sample number) location of the center of the sliding window, although other arrangements are possible.

The sliding window is then moved down the trace and repositioned for the next calculation. The preferred amount of movement is only a single sample, although other step sizes are certainly possible and have been contemplated by the inventors. Thus, the second window differs from the first by only a single data value. At this new position, the FFT is calculated and the complex values resulting therefrom are stored in the same sub-band traces as before, taking care to always place coefficients corresponding to the same Fourier frequencies in the same sub-band trace. If the step size is a single sample, the complex values from the second window will be stored in the sub-band traces one sample below those of the first window. The sliding window is then repositioned, another calculation occurs, and these new values are stored as before. This process is repeated throughout the length of the first trace or until some shorter interval of interest has been processed.

At the conclusion of the foregoing process, each sub-band trace contains all of the calculated samples for a "single" Fourier frequency. (In actuality, the coefficients so produced represent the spectral power present in a narrow frequency band centered around the nominal Fourier frequency, rather than the power at single frequency, hence the use of quotation marks. In the text that follows, those skilled in the art will understand that whenever a Fourier transform frequency is mentioned, a narrow band of frequencies is actually intended.) These traces are then set aside and the above process is repeated for the next trace in the shot record. As before, this next trace will fill its sub-band traces with the complex samples corresponding to the different Fourier frequencies. Continuing as before, every trace in the shot record is similarly transformed.

What has been produced as a consequence of the foregoing operations is a collection of sub-band traces that, when properly organized, may be used to display the entire shot gather at any single Fourier frequency. In more particular, by collecting all of the sub-band traces that contain samples corresponding to the first Fourier frequency and arranging them in the same the spatial ordering as that of the input data traces, a single-frequency sub-band panel is created that can be directly correlated with the input data. The traces comprising this sub-band panel are said to be in the FT (frequency-time) domain, as each sample represents a Fourier frequency but the time domain remains untransformed. In the same fashion, a sub-band panel corresponding to the second Fourier frequency may be similarly constructed, and so on.

Thus, the original data traces, a shot gather in the present illustration, have been decomposed into a collection of single-frequency sub-band panels, each panel corresponding to a separate Fourier frequency band. There are a variety of uses that may be made of these transformed data. For example, the sub-band panel may be muted in the FT domain then inverse transformed to remove unwanted seismic events from the section. Operations on the sub-band panels may generally be used to enhance the quality of the recorded seismic signal or used to create interpolated seismic traces Alternatively, these sub-band panels may be examined and interpreted as found, or further manipulated to produce additional seismic attributes which may have use in seismic exploration.

When the sub-band panel are used for purposes of noise editing and removal, it is generally a simple matter to find and excise a coherent noise event. If the event can be located in the time-offset domain, it will be found at the same relative time and offset in the FT transformed domain. By searching through the collection of sub-band panels and muting the noise event in the sub-band panel or sub-band panels in which it is most conspicuous, it is possible to directly eliminate the noise without introducing distortions into other portions of the edited traces. Further, other traces in the gather that are not actually edited will be unaffected by the noise removal process.

In the same fashion that coherent noise may be attenuated by judicious sub-band panel editing to reduce the magnitudes of various Fourier frequency values, it is also possible to enhance a seismic signal by increasing the coefficients in certain sub-band panels. By way of example only, one method of spectrally balancing a collection of seismic traces would be to calculate sub-band traces therefrom, AGC each individual sub-band trace, and invert the sub-band traces back into the x-t domain. (For a discussion of some of the types of AGC which are commonly used in the seismic processing arts, see Chapter 1.5 of *Seismic Data Processing*, Ozdogan Yilmaz, Society of Exploration Geophysicists, 1987, the disclosure of which is incorporated herein by reference.) Additionally, if the explorationist or processor so desires, it would be possible to increase the magnitudes of Fourier coefficients associated with specific reflectors, thereby changing the spectral characteristics of the reflectors without producing an impact on the remainder of the seismic data in the edited trace. Thus, the method of the present invention can function as a general purpose frequency filter: increasing desirable frequency components and/or attenuating undesirable ones.

According to a second aspect of the present invention there has been provided a system for automatic trace editing, wherein a VSTFT is applied to a plurality of related seismic traces to form sub-band panels, the panels are statistically analyzed to identify aberrant or bad traces, and the original data traces corresponding to the aberrant traces in the FT domain are flagged or marked as "dead." In more particular, seismic traces that contain "spikes" or other wild data values will reflect that fact in the FT transform domain by exhibiting large data values in one or more sub-band panels. It is possible, based on statistical criteria, to identify those values in the FT domain. Given that an FT sub-band trace has been identified as having problems, the editing program then kills (i.e., marks as "dead" and thereby causes said trace to be ignored in subsequent processing steps) the original untransformed trace.

The advantage of an FT based approach to automatic trace editing is that conventional editing methods that operate in the x-t domain often have trouble differentiating between strong reflectors and noise. It might seem tempting in general to construct an x-t based noise identification scheme wherein the presence of seismic data values exceeding a certain threshold indicate that the trace is bad. However, that approach may cause good traces with legitimate high amplitude reflectors to be marked as dead. The FT based approach, on the other hand, examines the seismic values in individual sub-band panels and thereby isolates those frequencies in which the noise energy is predominant. Thus, a trace that is identified as being bad in this domain has a lesser chance of being a non-noisy trace.

According to a third aspect of the present invention there has been provided a system for generating seismic attributes, wherein a VSTFT is applied to a plurality of related seismic traces to produce sub-band data which is subsequently displayed and examined for correlations with subsurface rock contents, rock properties, subsurface structure or layer stratigraphy. Alternatively, the Fourier transform values stored in the sub-band panels may be further manipulated to generate new seismic attributes that can be useful in exploration settings. The importance of this aspect of the present invention is best described as follows. It is well known in the seismic interpretation arts that spatial variations in a seismic reflector's character may often be empirically correlated with changes in reservoir lithology or fluid content. Since the precise physical mechanism which gives rise to this variation in reflection character may not be well understood, it is common practice for interpreters to calculate a variety of seismic attributes and then plot or map them, looking for an attribute that has some predictive value. The attributes produced from the sub-band panel calculations represent localized analyses of reflector properties (being calculated, as they are, from a short-time transformation) and, as such, are potentially of considerable importance to the advancement of the interpretation arts.

According to a fourth aspect of the present invention there has been provided a system for interpolating traces, wherein a VSTFT is applied to a plurality of spatially related seismic traces and the sub-band panels thereby produced are used to create additional traces by interpolation. In more particular, it is often the case that it is desirable to estimate the seismic response at surface locations where the subsurface signals have not actually been recorded. If there are traces that have been recorded nearby, it is well known in the art that it is possible to calculate representative seismic traces by interpolation (or extrapolation in some cases) from known traces. There are any number of ways to accomplish this interpolation, but in the context of the present invention interpolation is preferably calculated in the FT domain according to the following method. First, a collection of seismic traces from which an interpolated trace is sought are brought together. This collection is transformed to the FT domain, as disclosed above, thereby creating a collection of sub-band panels. Next, within each sub-band panel, a new sub-band trace is created by interpolation using the coefficients stored therein, thereby creating as many interpolated sub-band traces are there are sub-band panels. Note that the interpolation contemplated herein involves the use of complex transform values, not just the real magnitude of each complex value. Finally, the collection of interpolated sub-band traces are inverted via the VSTFT back into the x-t domain, thereby creating a single interpolated seismic trace.

It is important to note that, in all of the above described embodiments, the fact that the original untransformed traces were spatially related provides additional utility to the invention disclosed herein. In more particular, it is well known that short-window Fourier transform coefficients are inherently quite noisy and have poorer frequency resolution in comparison with a longer window transform. One approach that the present inventors have used to improve the reliability of the transformed values is to apply a Gaussian weight function to the pre-transformed data values.

However, another equally important step taken by the present inventors is to display the traces within a sub-band panel in the same spatial relationship as the input data. Since the traces so displayed contain spatially correlated information, plotting them next to each other allows the observe to visually "smooth out" the noise and perceive the underlying coherent signal information. Where the FT transform of single trace by itself might be too noisy to be of much use, a collection of similarly transformed traces can provide useful information.

Finally, although the present invention is discussed herein in terms of the discrete Fourier transform, in reality the Fourier transform is just one of any number of discrete time data transformations that could used in exactly the same fashion. The general steps of (1) computing a sliding short window transformation (2) associating the resulting transform coefficients into sub-band traces, and (3) forming the sub-band traces into sub-band panels for editing or analysis purposes, could be accomplished with a wide variety of discrete data transformations other than the Fourier. If the transformation is other than a Fourier, the sub-band traces and panels would be formed by grouping together coefficients corresponding to the same basis function.

Those skilled in the art will understand that a discrete Fourier transform is just one of many discrete linear unitary transformations that satisfy the following properties: (1) they are linear operators that are (2) exactly invertible, and (3) their basis functions form an orthonormal set. In terms of equations, if x(k), k=1, L, represents a time series, and X(n) its "nth" transformed value, n=1, L, then the forward transform of the time series may be generally written for this class of transformations as:

$$X(n) = \sum_{k=0}^{L-1} x(k)A(k; n),$$

where A(k;n) represents the forward transform kernel or collection of basis functions. Further, there is an inverse transform which maps the transformed values back into the original data values:

$$x(k) = \sum_{n=0}^{L-1} X(n)B(k; n),$$

where B(k;n) is inverse transform kernel. The requirement of orthonormality implies that the inner products between two different basis functions must be equal to zero, and the magnitude of each basis function must be equal to unity. This requirement may be succinctly summarized by the following equations:

$$\sum_{n=0}^{L-1} A(j; n)A^*(k; n) = \delta(j - k)$$

$$\sum_{k=0}^{L-1} A(k; n)A^*(k; m) = \delta(n - m)$$

where $$\delta(n - m) = \begin{cases} 0, n \neq m \\ 1, n = m \end{cases},$$

and $A^*(k;n)$ represents the complex conjugate of A(k;n). For the discrete Fourier transform, the basis functions corresponding to a forward transform of length L are conventionally chosen to be the set of complex exponentials:

$$A(k;n) = \{e^{-2\pi i k n/L}, k=0, L-1 \}$$

There are thus L basis functions (or basis vectors in this case), one basis function for each value of "n":

$$n = -\frac{L}{2}, \ldots, 0, \ldots \frac{L}{2} - 1.$$

To summarize: each transform coefficient, X(n), calculated within a sliding window corresponds to a particular basis function, and a sub-band panel is formed by collecting all of the coefficients corresponding to a particular basis function and placing them into a single trace or panel.

By way of another specific example, those skilled in the art understand that a discrete Walsh transform could be used in place of the Fourier transform and the Walsh coefficients similarly grouped, displayed, and analyzed. In the manner disclosed above, a Walsh transform may be computed within an overlapping series of sliding windows and the coefficients resulting therefrom organized and stored into sub-band traces. Rather than the calculated transform coefficients representing frequency, of course, these coefficients instead represent a similar quantity called "sequency" by those skilled in the art. Thus, "single sequency" sub-band traces and panels can be formed from the Walsh transform coefficients in a manner exactly analogous to that used in the construction of Fourier sub-band panels.

Finally, although the discrete Fourier transform is a transform that is characterized by a set of orthonormal basis functions, application of a non-trivial weight function to the basis functions prior to computation of a transformation destroys their orthonormality. Under conventional theory, a weight function that is applied within a window is viewed as being applied to the basis functions rather than the data, thereby preserving the integrity of the underlying data. However, basis functions that were orthogonal before application of the weight function will generally no longer be so thereafter. That being said, in point of fact whether the weight function is applied to the data or to the basis functions, the end computational result after transformation is exactly the same.

One means of avoiding the minor theoretical dilemma that arises when a weight function is used with a discrete orthonormal transform is to select an orthonormal transform/weight combination which is not so affected. By way of example, the local cosine (and local sine) transform is a discrete orthonormal transform wherein the weight function of choice is a smooth, specially designed taper that preserves the orthonormality of the basis functions at the expense of some loss in frequency resolution. Further, the underlying rationale of the local cosine/sine transform provides a natural theoretical bridge to the field of general wavelet transforms.

DETAILED DESCRIPTION OF THE PREFERRED EMBODIMENTS

The instant invention provides a method of processing seismic data using the VSTFT to remove noise, identify aberrant traces, or generate attributes for seismic stratigraphic analysis.

Figure 1:
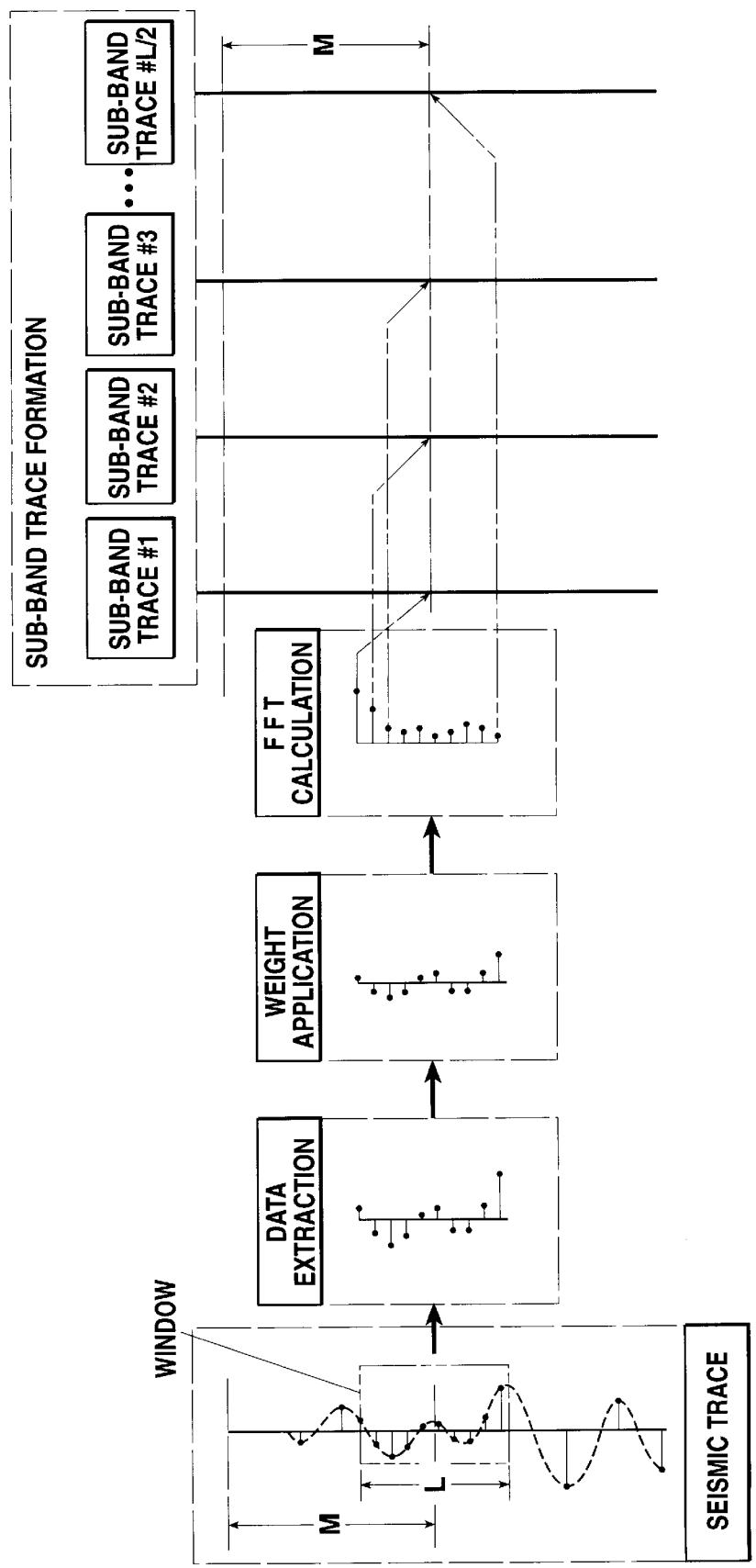
FIG. 1 is a schematic diagram that illustrates generally how sub-band traces are formed.

By way of an overview, the present invention processes a seismic trace using a VSTFT and thereby produces several output traces for each input trace so processed. As is best illustrated in FIG. 1, a window of length L is positioned with its central value initially at some distance M into the seismic trace. At the point where the window is positioned, the data within the window are extracted, a taper or weight function is applied to the extracted values, and a discrete Fourier transform of the data is calculated, thereby producing amplitude and phase information for the data within that short window. The transformed data, consisting of Fourier coefficients, are saved into sub-band traces and remain associated with the location M of the center of said window. The window location M is then incremented, preferably by only one sample, and the process illustrated in FIG. 1 is repeated until the sliding window has been sequentially applied to the target portion of the trace. At each window position, care is taken to always place the Fourier coefficient corresponding to a particular frequency into the same sub-band trace, thereby forming constant frequency sub-band traces. The output data set (sub-band traces) contains all of the Fourier coefficients calculated for all of the window positions, organized by frequency. Finally, if there are additional, related, traces to be similarly transformed, they are processed in a manner identical to that disclosed above and their numerous short-window Fourier transforms are also saved in sub-band traces for later display or analysis.

Although the presently preferred embodiment of the invention disclosed herein increments each window position by a single sample, other increments are certainly possible and have been contemplated by the inventors. In the event that the window increment value is larger than unity, the approach described above may be modified slightly to add an interpolation step. In more particular, a step size equal to, for example, two would leave every other storage location in the sub-band trace unfilled. It would then be a simple matter to interpolate between calculated values to fill in the "holes." Similarly, for a step size equal to three, two values would need to be interpolated between each calculated value, etc.

For purposes of illustration only, the text that follows will describe the present invention as applied to a shot gather, although those skilled in the art realize that many other input data choices are possible.

Figure 2:
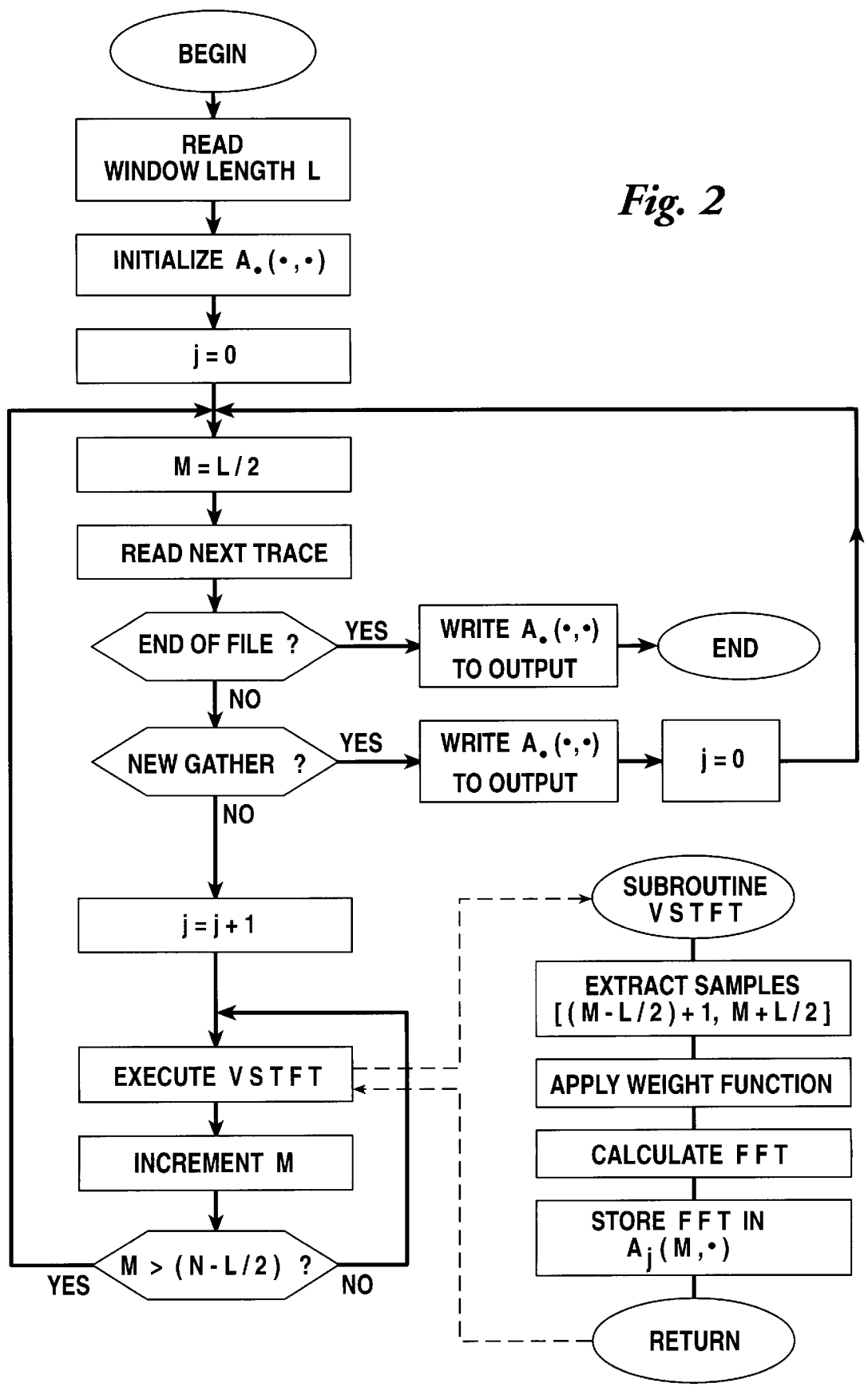
FIG. 2 is a flow chart that illustrates the details of the VSTFF computational scheme.

Turning now FIG. 2, wherein the present invention is disclosed in greater detail, let the integer variable "N" represent the number of samples in each seismic trace and let "L" represent the integer length, in samples, of the sliding VSTFT window. The window length is typically chosen by the user to be an integer power of two, i.e., $L=2^K$, where K is a positive integer. This allows the computational efficiency of the FFT to be brought into play. Otherwise, a general discrete Fourier transform could be used where the chosen window length is some other arbitrary value not a power of two.

In the presently preferred embodiment, auxiliary storage must be provided in which to save the calculated VSTFT transform, said storage being at least as large as N*L words in extent, with even more storage being required if the seismic data values or the transformed results are to be kept as double (or higher) precision. By way of explanation, a Fourier transform of a real time series of length L requires storage for L/2 complex data values, each of which normally requires two computer words of storage. (There are actually only [(L/2)−1] unique complex data values, rather than L, because for a real time series the Fourier transform coefficients corresponding to positive and negative frequencies are directly related: they are complex conjugate pairs. In addition, there are two real values: the coefficient at zero ("dc") hertz and the coefficient at the Nyquist frequency, both of which can be stored in a single complex data value.) Since approximately "N" short-window Fourier transforms will be calculated, the total amount of storage required is N*L. Further, if "NG" is an integer variable that represents the number of traces in the shot record, the total amount of auxiliary storage required would be at least NG * N * L words.

When the transformed data are saved into the auxiliary storage traces, they are stored according to the following scheme. For each trace in the shot gather, a plurality of sub-band traces are formed, the exact number of traces being a function of the length of the Fourier transform window. Within each sub-band trace is stored all of the amplitude and phase values for a single Fourier frequency from every sliding window FFT calculated from that trace. Said another way, there is one accumulator trace for each Fourier coefficient in the short-window transform. Each of the accumulator traces contains all of the Fourier coefficients corresponding to a single Fourier frequency, one coefficient having been extracted from each of the sliding windows. Further, the position each coefficient occupies within an accumulator trace corresponds to the center sliding window it was extracted from. This arrangement is of critical importance for purposes of sub-band analysis, because a seismic event that occurs at a particular time and offset in the untransformed domain will be found at the precisely the same time and offset in the sub-band (transformed) domain. Let the three-dimensional array $A_*(\bullet, \bullet)$ represent the complete collection of sub-band traces. Note that a bullet symbol "•" has been used in place of variable names in describing the auxiliary storage array. This simply indicates that the index which has been replaced is taken to range over all of its possible values. The indices of this array will be discussed in more detail below.

Let x(n) represent the seismic trace that is currently being analyzed, where $1 \leq n \leq N$. The time separation between successive values of x(n) (i.e., the sample rate) will be denoted by $\Delta t$, where $\Delta t$ is customarily measured in milliseconds. Each trace, therefore, contains a recordation of (N−1)*$\Delta t$ milliseconds of data, the first sample conventionally taken to be at "zero" time.

At the start of the process, the window length L must be acquired from the user. The presently preferred size for this variable is 16 or 32, both integer powers of 2, but other values are also possible and anticipated by the present inventors. As a next step, as illustrated in FIG. 2, the sub-band traces are initialized by allocating and clearing sufficient storage, based on the contemplated length of the sliding window and trace size, and the trace counter "j" is set equal to zero.

Beginning at the top of the trace, for each sample in said seismic trace a symmetric sliding window of length L is formed thereabout. Let the integer variable "M" represent the center of the sliding window. Of course, for a window of an even number of samples there is no true center, so let M be defined to be equal to the L/2 sample within a window. Practically speaking, the value of M is bounded above and below as indicated in the following expression:

$$\frac{L}{2} \leq M \leq N - \frac{L}{2},$$

because at either end of the trace a symmetric window cannot extend beyond the actual data values. Alternatively, rather than limiting the value of M the upper and lower ends of the trace might be "padded" with additional values to allow M to range from 1 to N. In practice, the user might elect to process less than the entire trace and the limits on M would be adjusted accordingly to conform to that requirement. However, the embodiment disclosed in FIG. 2 is presented by way of an example of how the present invention would operate if applied to an entire seismic trace.

After setting M initially equal to L/2, a seismic trace is read into the variable x(•). A test for an "End of File" condition follows the read and determines whether the program terminates or continues onward. If the "End of File" test indicates that the end of the data have been reached, the current contents of the auxiliary storage array (sub-band panel) are saved and the program ends. The step of saving the sub-band panel array might be accomplished, for example, by writing the array to disk, moving it into a different memory location, etc.

If the "End of File" test fails (i.e., the last input attempt returned another trace), the seismic trace header words are examined to determine whether or not this trace is from the gather currently being analyzed. If the "New gather" test indicates that the last-read trace is from a different gather, the sub-band panel is again saved, and the trace counter "j" is reset to zero.

Within the sliding window, the VSTFT is computed for a symmetrically located window of length L centered about point M. As a first step, the data values within the window are extracted from the input trace x(•)

$$y(k) = x\left(M - \frac{L}{2} + k\right), \quad k = 0, L-1$$

and the weight function is applied:

$$y(k) = y(k) * w(k), k=0, L-1,$$

where the array y(•) is a temporary storage area. The weight function w(•), or data window as it is referred to by some, could take any number of forms. Some of the more popular data windows are the Hamming, Hanning, Parzen, Bartlett, and Blackman windows. Each window function has certain advantages and disadvantages. The present inventors, however, have discovered that the use of a Gaussian window is in many ways optimal for this application. The Gaussian weight function is defined by the following expression:

$$w(k) = \sigma_3 e^{-(k-L/2)^2/\sigma_2}, k=0, L-1$$

where, $$\sigma_1 = \frac{L}{6}, \sigma_2 = 2\sigma_1^2, \sigma_3 = \frac{1}{\sqrt{2\pi\sigma_1}}.$$

In general, though, the weight function should be a real function and non-zero over its range.

After the weight function has been applied, the FFT is then calculated according to the following expression:

$$X(n) = \sum_{k=0}^{L-1} y(k) e^{-2\pi i k n/L}, \quad n = -\frac{L}{2}, \ldots, 0, \ldots \frac{L}{2} - 1,$$

where X(n) represents the complex Fourier transform coefficient at the frequency, $f_n$, said frequency being dependent on the length of the window L. In general, it is well known that the FFT produces coefficients that provide estimates of the spectral amplitude at the following Fourier frequencies:

$$f_n = \frac{n}{L(\Delta t/1000)}, \quad n = -\frac{L}{2}, \ldots, 0, \ldots \frac{L}{2} - 1.$$

It should be noted that the nominal sample rate of a seismic trace, $\Delta t$, may not be the same sample rate at which the data were acquired in the field. For example, it is common practice to resample a seismic trace down to a lower sample rate to save storage when there is little useful information at the highest recorded frequencies. On the other hand, on occasion a seismic trace may be sampled up to a higher sampling rate when, for example, it is to be combined with other—higher sample rate—lines. In either case, the nominal sample rate of the data may not accurately reflect its true spectral bandwidth. A simple modification of the previous equation will accommodate that contingency:

$$f_n = \frac{n}{L} F_{max}, \quad n = -\frac{L}{2}, \ldots, 0, \ldots \frac{L}{2} - 1,$$

where $F_{max}$ is the highest frequency contained in the data.

Since a seismic trace is a "real" function (i.e., non-imaginary), its Fourier transform is symmetric and the Fourier coefficients corresponding to the positive and negative frequencies are related as follows:

$$RE[X(f_n)] = RE[X(f_{-n})],$$

and $$IM[X(f_n)] = -IM[X(f_{-n})],$$

where RE[z] is a function that extracts the real portion of the complex value z, and IM[z] extracts the imaginary portion. As a consequence of this relationship, only L/2+1 unique values are produced within each VSTFT window. Thus, for purposes of specificity, only the positive frequencies will be considered in the discussion that follows, although those skilled in the art understand that the same results could have been obtained by utilizing only the negative frequencies.

A next step in the process involves placing the calculated complex frequency values into the sub-band traces. These traces are filled with the calculated Fourier coefficients as indicated below:

$$A_j(M,i) = X(i), i=0, L/2,$$

wherein, M is the current window center, and "j" is an index that counts the number of traces that have been processed for this gather, j=1, NG. Thus, the array $A_j(•,•)$ represents the entire collection of sub-band traces for trace number "j". Further, the array of traces $A_*(•,i)$ represents the "i"th sub-band panel: a collection of traces containing Fourier coefficients corresponding to a "single" frequency. In practice, the array $A_*(•,i)$ may not ever actually be kept entirely in RAM at one time, but may be located, in whole or in part, on tape or disk.

After the Fourier coefficients have been stored, the subroutine returns control to the calling program at which time the value of M is incremented, usually by adding one to its current value. Of course, incremental step sizes other than unity are also possible, and have been contemplated by the present inventors. After incrementing M, the value of M is tested to determine whether or not the end of the trace has been reached. If not, another VSTFT is calculated. If the test indicates that the end of the trace has been reached, i.e.,

M>N−L/2, or that M is beyond the time interval selected by the user, then M is reset to L/2 (or some other user specified value) and the next trace is read.

Figure 3:
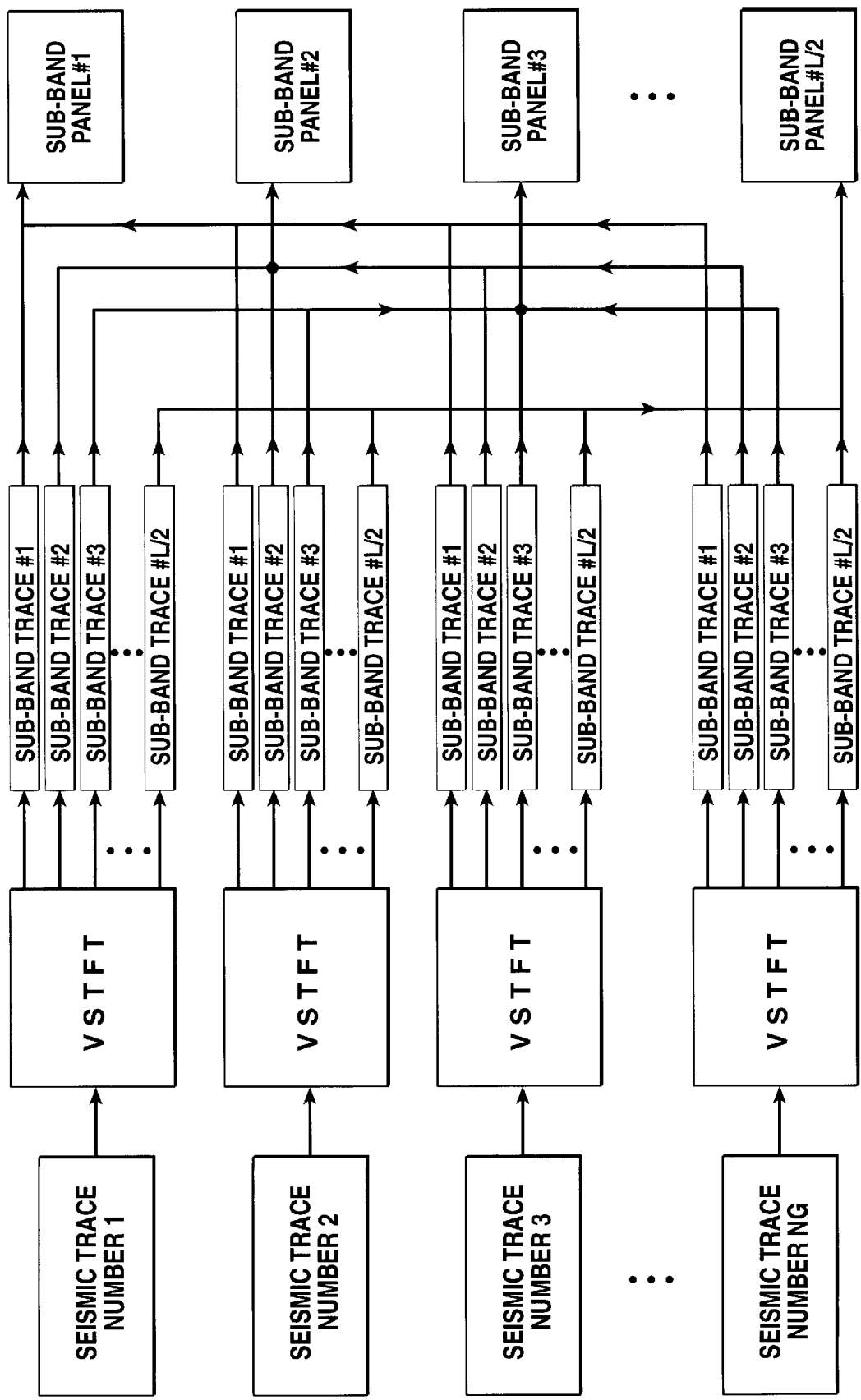
FIG. 3 is a schematic overview of the process by which sub-band panels are calculated and assembled.

After a gather has been processed, the transform may now be formed into sub-band panels. As is illustrated generally in FIG. 3, each seismic trace is separately passed through the VSTFT process and thereby produces a collection of sub-band traces. The sub-band traces are then reorganized into sub-band panels in preparation for further analysis, each sub-band panel containing the Fourier coefficients for a single frequency θ, where:

$$\theta = \frac{K}{L(\Delta t/1000)}, \quad K = 0, \frac{L}{2}.$$

Thus, each trace processed via this procedure contributes exactly one trace to each sub-band panel. The sub-band panels so calculated may now be displayed, studied, analyzed or edited before calculating the inverse transform.

Note that the operations described above will result in sub-band panels that potentially contain complex data values. For editing and analysis purposes, it is usually sufficient to use only the (real) magnitude of each of these values and the Fourier coefficients contained within the sub-band panels may easily be converted thereto by applying the following standard operation:

$$A_j(M,i) = |A_j(M,i)|.$$

However, in order to invert the sub-bands back into the x-t domain, it will be necessary to retain and re-use the original phase angle for each data item. Thus, although the editing and display may be applied to the real amplitudes (spectral magnitude) only, the phase must be retained for use in computing the inverse.

After editing, the complex values in the sub-band panels may be returned to the x-t domain through the use of the inverse FFT, or inverse discrete Fourier transform if appropriate. The equation that describes the computational details of inverting the sub-band traces is based on a standard discrete inverse Fourier transform. First, the complex values associated with the "j"th trace in the gather at the "M"th time point are extracted:

$$X(k) = A_j'(M, k), \quad k = 0, \frac{L}{2}$$

where $A_j'(M,k)$ has been used to a represent a possibly "edited" version of the original $A_j(M,k)$ array. The array X(k) is then filled out by symmetry by "folding" the values about the point L/2:

$$RE\left[X\left(m+\frac{L}{2}\right)\right] = RE\left[X\left(\frac{L}{2}-m\right)\right], \quad m = 0, \frac{L}{2}-1,$$

and $$IM\left[X\left(m+\frac{L}{2}\right)\right] = -IM\left[X\left(\frac{L}{2}-m\right)\right], \quad m = 0, \frac{L}{2}-1.$$

It is well known to those skilled in the art that the preceding steps may not be strictly necessary, as there are specially designed inverse Fourier transform routines which operate directly on the shorter, unfilled array by exploiting the symmetry of the missing coefficients. The inverse transform is now computed and stored at the midpoint of the window from which the original transform values were acquired:

$$x'(M) = \frac{1}{L} * \frac{1}{w(L/2)} \sum_{k=0}^{L-1} X(k) e^{+2\pi i k n/L},$$

where the notation x'(M) has been used to indicate that the result of this transformation will not return the original input value x(M) if the data have been modified while in the transform domain. Based on standard discrete Fourier transform theory, it should be clear that if there has been no editing of the sub-band traces, the process of inversion should exactly return the original input seismic data values, or at least the "exact" values to the limits of normal computational accuracy.

In words, the previous equation simply indicates that a standard inverse discrete Fourier transform should be applied by collecting all of the separate complex frequency values that correspond to the window centered about the sample M, and then applying a standard inverse Fourier transform. The divisor, L, in the previous equation is the standard normalization constant for an inverse Fourier transform. Division by the quantity w(L/2) removes the effect of the weight function that was applied prior to calculating the forward transform.

Figure 4:
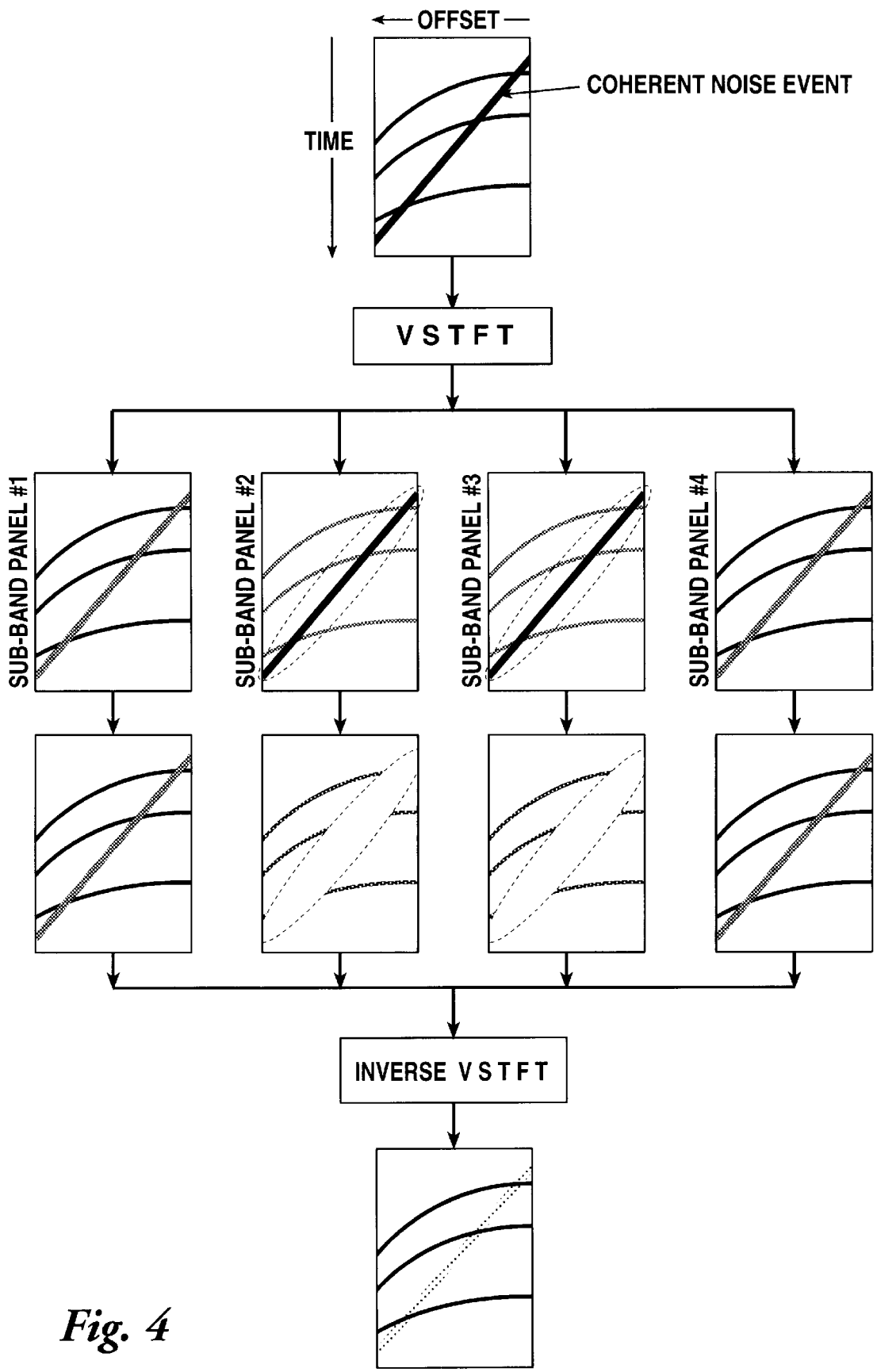
FIG. 4 is a schematic overview of the process by which coherent noise may be removed from a seismic section in the sub-band panel domain.

Given a collection of sub-band panels, the first embodiment disclosed above may be implemented. Referring now to FIG. 4, wherein is displayed a collection of spatially related seismic traces containing a coherent noise event, the first step in the noise removal process is to identify those events whose amplitude it is desired to attenuate. For purposes of illustration, the coherent noise is displayed in the top panel of FIG. 4 as having linear moveout, whereas the legitimate seismic reflections are depicted as having some degree of non-linear (typically hyperbolic) moveout. Having located the noise in the offset-time (or x-t) domain, the next step is to transform the gather via the VSTFT and display the values so transformed in sub-band panels.

As it should be clear from FIG. 4, since the transform coefficients are stored in the same relative time and offset locations as the center of the window from which they were calculated, the appearance of the sub-band panels is remarkably similar to that of the input data. Thus, it becomes a simple task to locate once again the coherent noise energy in the various sub-band panels after transformation. In more particular, the presently preferred practice is to identify those sub-band panels in which the coherent noise energy is most pronounced, the reflector energy present in the sub-band panels being generally indicated in FIG. 4 by the darkness of the line representing each separate event.

Having found those sub-band panels having the most clear expression of the coherent noise event, Sub-Band Panels #2 and #3 in FIG. 4, the noise energy is eliminated therein by editing or applying a mute. In FIG. 4, the suggested mute is the elliptical region drawn over the coherent noise event in Sub-Band Panels #2 and #3, the lower set of panels indicating the result after the mute has been applied. Finally, after application of the mute, all of the sub-band panels, edited and unedited, are inverted via the VSTFT to produce a collection of spatially related seismic traces in which the coherent noise event has been greatly attenuated. Note that the mute pattern illustrated in FIG. 4 is just one of many that could have been applied and is a realistic choice in the sense that it is almost impossible to consistently mute only the noise event without encroaching somewhat on the signal. Note also that the edit or mute pattern may be of a different shape in each sub-band panel, thereby allowing for a frequency dependent noise reduction scheme.

Figure 7:
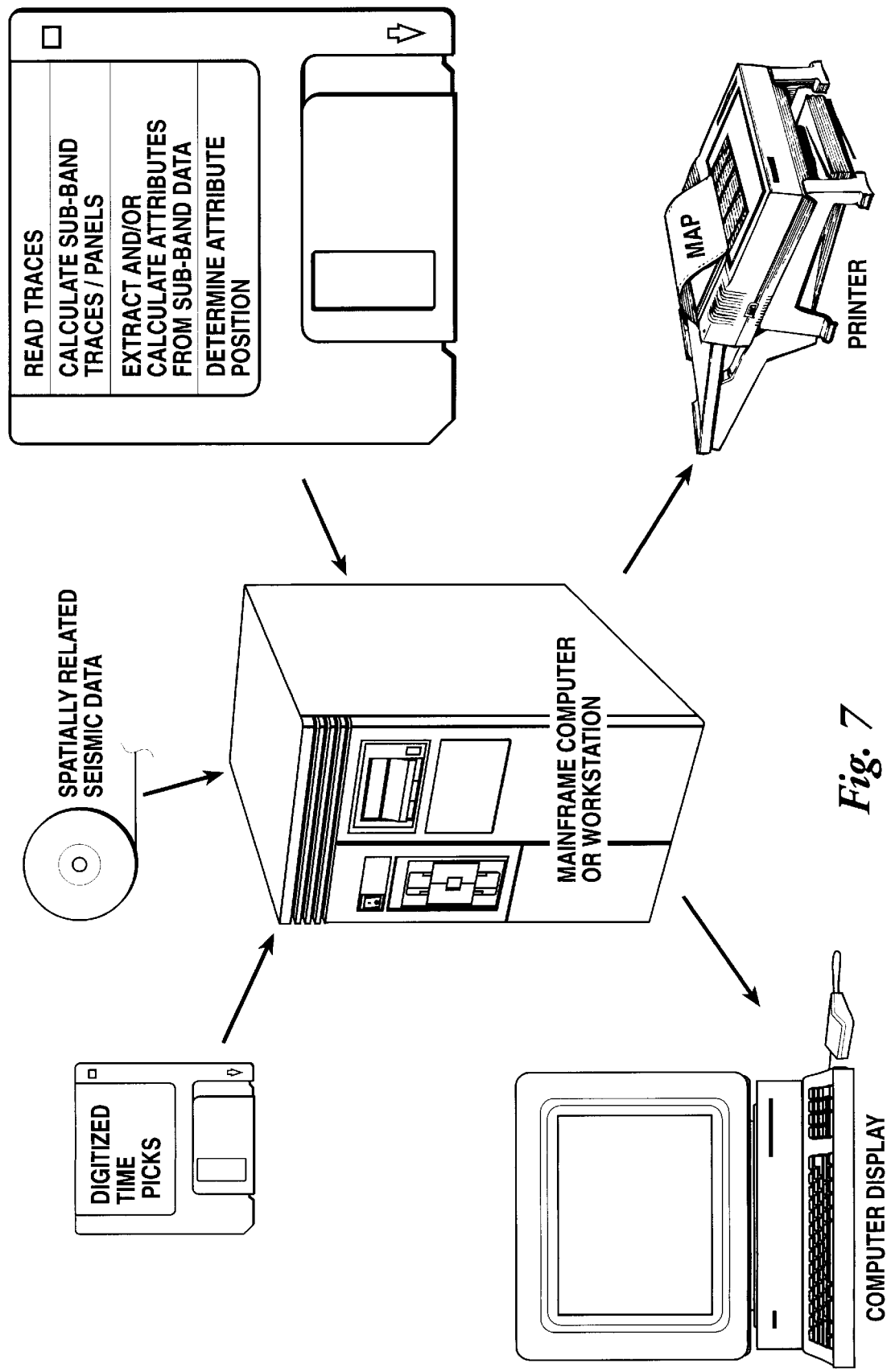
FIG. 7 is a schematic diagram depicting one embodiment of the present invention.

Turning now to FIG. 7, according to a second aspect of the present invention there has been provided a system for calculating seismic attributes, wherein a VSTFF is applied to a plurality of associated seismic traces and the resulting transformed data values, or additional attributes subsequently calculated therefrom, are correlated with subsurface structure, lithology, rock parameters, etc. In this embodiment, the collection of seismic traces might be, for example, a stacked 2-D section or a 2-D line that has been extracted from a stacked 3-D seismic data volume. Additionally, it could also be an unstacked CMP gather or a VSP survey if attributes associated with AVO are sought.

As disclosed supra, this collection of related seismic traces is transformed via the VSTFT process to produce a suite of single-frequency sub-band panels. These sub-band panels contain localized amplitude and phase information as a function of time for each trace in the collection. These data, amplitude and phase, may be used directly as seismic attributes and their values visually or otherwise correlated with known hydrocarbon bearing formations, subsurface structure, lithology, etc. The present embodiment is particularly useful because if a target reflector has been "picked" on a stacked section, its associated attributes will be found at the same picked times on all of the sub-band panels, as has been broadly illustrated in FIG. 7. Similarly, unstacked CMP gathers may be transformed and examined for changes in reflector character with offset (i.e., AVO effects). Once again, it is particularly easy to locate the event of interest in the F-T domain as it will be found at the same time and offset as it appeared in the x-t domain.

The phase portion of the sub-band panel coefficients may be of particular importance to the interpreter. The phase, $P_j(M,i)$ of a sub-band panel is computed for each coefficient in a sub-band panel as follows:

$$P_j(M, i) = \tan^{-1}\left(\frac{IM(A_j(M, i))}{RE(A_j(M, i))}\right).$$

Conventional phase displays (e.g., Hilbert transform instantaneous phase) are routinely used in exploration to help interpreters track weak reflectors across a seismic section. The sub-band panel displays can be used in a similar fashion, but with additional functionality. For example, the sub-band phase plot allows the interpreter to track a reflector, not within just a single plot, but within the sub-band panel or panels in which that reflector is most pronounced. Further, an instantaneous phase type plot produces a single composite estimate of the phase at each point on the section: the sub-band panel phase plots, on the other hand, give an estimate of the phase at a variety of different frequencies at each point on the section.

In addition to direct display of the amplitude and phase data, the sub-band panel collections provide a wealth of additional attribute computation possibilities. Center frequency at each time point, ratios of amplitudes at different Fourier frequencies, and phase differences between different frequencies are just some of the host of additional attributes that could potentially be calculated from the sub-band panel data at each time point on every trace. Each of these attributes is a quantitative value and could, therefore, be mapped and correlated, for example, with changing subsurface rock properties, local stratigraphic anomalies, or known hydrocarbon occurrences.

Further, the increasing use of exploration workstations has made possible automatic analysis and mapping of seismic reflector attributes. In more particular, explorationists often locate seismic events of interest by digitizing time picks ("picking") either on a digitizing table or, more commonly, at a seismic workstation. When an event is picked, the explorationist attempts to pinpoint the same reflector feature (e.g., peak, trough, zero crossing, etc.) on every seismic trace in which it appears, the ultimate goal being the production of a computer file that contains time and surface location information that tracks the event across a 2-D section or through a 3-D volume. Given this information, a computer program can be designed to read the picks and extract whatever amplitude value might be stored in the seismic trace (or, as an alternative, a sub-band trace calculated therefrom) at or near the time pick. The picks might be also used, by way of example only, to define the center of an analysis window that tracks an event of interest. Additional attributes might then be calculated from the data enclosed by the window. In either case, by combining this extracted or calculated information with seismic trace surface location data, plots and maps may be constructed that show the spatial variation in a particular attribute as the subsurface lithology changes. Of course, if the seismic trace amplitude information has been replaced by, for example, FT transform values, the chart or map produced therefrom would provide a spatial analysis of the variation in the FT data. The time correspondence between the FT and x-t domains makes reuse of same picks feasible and desirable.

According to a third aspect of the present invention there has been provided a system for automatic editing of bad traces from a seismic survey, wherein a VSTFT is applied to a plurality of spatially related seismic traces. In the present embodiment, the traces are preferably a single CMP gather, although a shot record or other assemblage of traces could also be used. "Bad" or aberrant seismic traces are individual traces that contain extreme numeric values. If not removed early in the processing sequence, i.e. "killed" in the parlance of the seismic processor, these traces can dominate the final stack of even high-fold lines and can create problems at every processing step.

Figure 5:
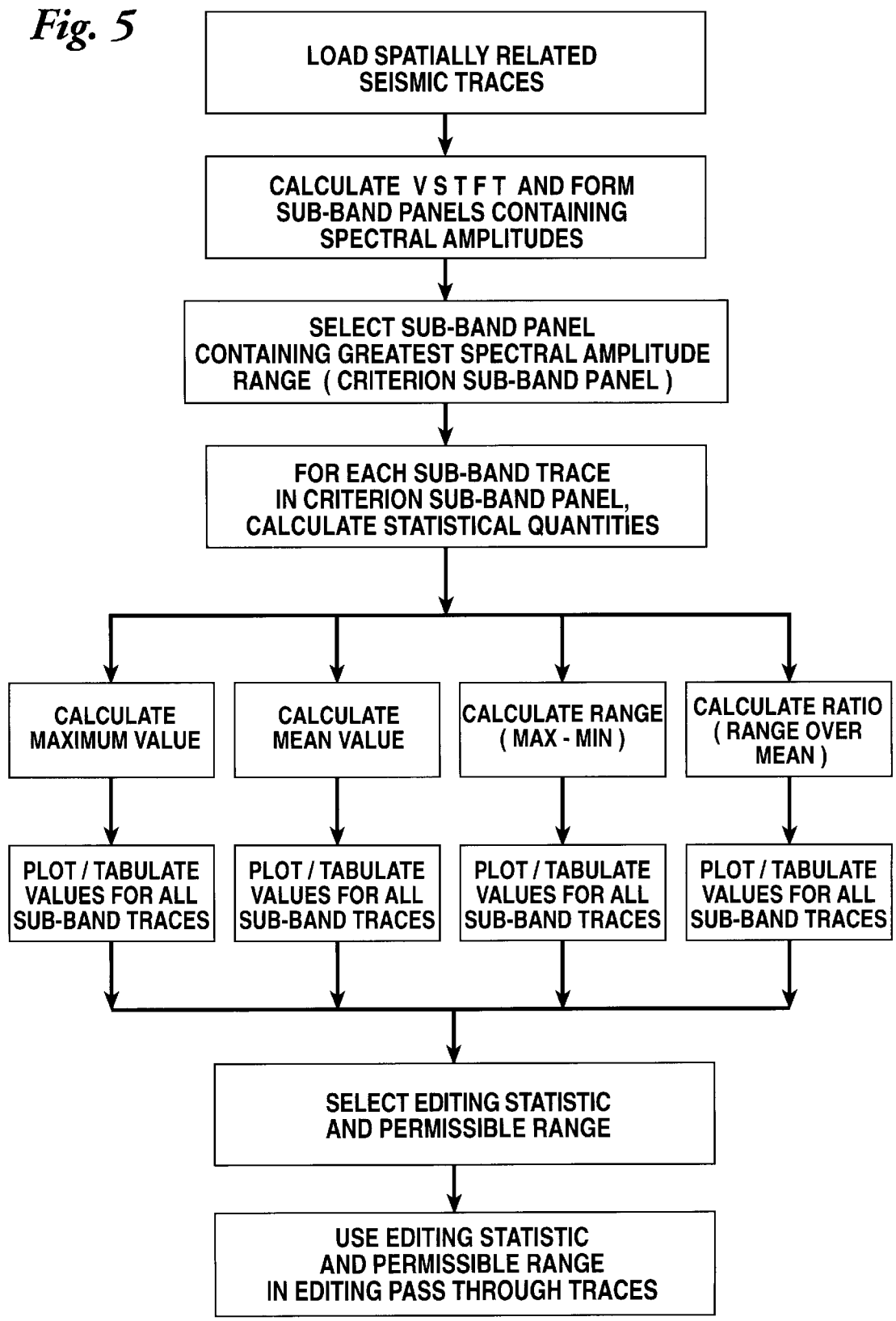
FIG. 5 is a simplified flow chart depicting the process of trace editing using sub-band panels.

As is best illustrated in FIG. 5, a first step in the realization of the present embodiment is to bring together a collection of spatially related traces, a CMP gather for purposes of illustration. The VSTFT process disclosed above is used to generate a plurality of sub-band panels from the CMP gather. The transformed sub-band panels are then statistically analyzed to find traces that have an "abnormal" statistical profile. A variety of statistical criteria could be used to differentiate good from bad traces, however the presently preferred method begins by determining and selecting, for this gather, the single sub-band panel that contains the greatest range of spectral amplitudes, referred to as the criterion sub-band panel hereinafter. The term "criterion statistic" will be used hereinafter to refer to the measure that is used to select the criterion sub-band panel, the spectral range of the entire sub-band panel in the present embodiment. Additionally, in the presently preferred embodiment the basis function (i.e., Fourier frequency in the case of a VSTFT) which is associated with the criterion sub-band panel is noted for use during the editing phase.

As a next step, a variety of individual trace statistics are calculated for each sub-band trace in the criterion sub-band panel: for example, the maximum and mean spectral amplitudes are calculated, as well as the range (difference) between the maximum and mean spectral amplitudes and the ratio of the range to the mean value. These various calculated values are then presented to the seismic processor for his or her review and are typically displayed in the form of a tabular listing, a graph, or a plot with trace number as the abscissa and maximum (or mean or range,etc.) spectral amplitude as the ordinate. In the present embodiment, the seismic processor then visually evaluates the tables and graphs containing the numbers so produced and selects a type of statistic (the "editing" statistic) and a threshold level that will be used to reject bad traces in a subsequent editing pass through the original data set. In some cases, the processor might also specify a minimum threshold level in place of, or in addition to, a maximum allowable value. A lower threshold limit might be employed to screen traces that contained no useful energy as might happen, for example, if there were recording problems.

As an example of how this method might be employed in practice, the processor might conclude that the sub-band trace maximum spectral amplitude provides the best discrimination between good and bad traces, and choose it, together with a specific maximum and/or minimum acceptable spectral amplitude, to be used in the editing pass discussed below. Thus, the "maximum spectral amplitude" and/or "minimum spectral amplitude" for a sub-band trace would be collectively designated as the "editing statistic" for this run. Guiding the processor in the selection of an editing statistic and specific numerical limits is the desire to eliminate traces with only the most troublesome noise bursts and retain legitimate traces with high signal amplitudes. Although familiarity with a particular type of data may provide insight as to the threshold to choose, the step of selecting the threshold value is at least in part a matter of trial and error, and this is especially so with unfamiliar seismic data.

During the second, or editing, pass through the data, the sub-band panels are not necessarily again formed, as only individual sub-band traces need be examined. Each trace that is read during the editing phase is first transformed into the FT domain, thereby producing a collection of sub-band traces. In the presently preferred embodiment, the editing statistic previously selected by the processor is next calculated only for the sub-band trace corresponding to the basis function associated with the criterion sub-band panel, although other variations are certainly possible and contemplated by the inventors. If the calculated statistic for this sub-band trace is outside the processor-selected threshold limits, the seismic trace from which it was computed is "killed" or excluded from further processing. The traces examined during the editing pass will normally include the traces from which the criterion panel and editing statistic were developed, as well as additional previously unexamined traces that will be screened using the same maximum and/or minimum editing statistic values. Note that it is common practice in the seismic processing industry to select a few CMPs from different points along a seismic line, individually analyze those CMPs finding a maximum and minimum for each, then interpolate these values to CMPs between the selected locations. In this manner, provision is made for changing noise characteristics along the seismic line while not requiring a processor to examine each and every CMP along the line.

As an alternative to the processor's manual evaluation and selection of the maximum and minimum criterion statistic, the present inventors contemplate that the procedure disclosed above could easily be automated by, for example, replacing the seismic processor's examination of the various single trace statistical values with any number of statistical tests designed to identify univariate outliers. In more particular, given some measure of the amplitude of the data in each sub-band trace, that collection of numbers constitute a sample which can be subjected to standard statistical analyses. The statistical analysis could be based, for example, on standard deviations, median deviations, or any other statistical measure of dispersion.

Figure 6:
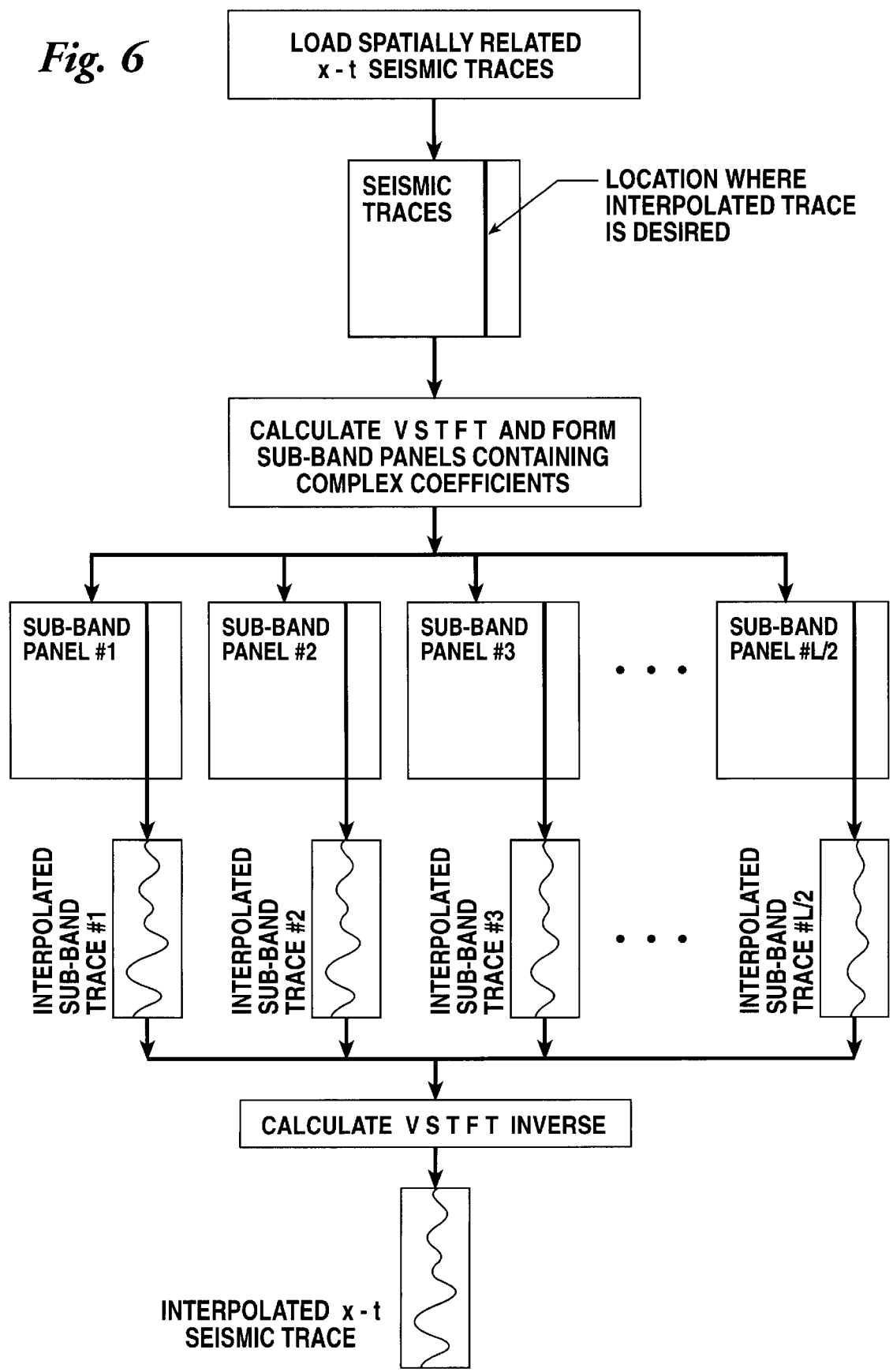
FIG. 6 is a schematic diagram depicting one embodiment of the present invention wherein a new geophysical time series is calculated by interpolation within a plurality of sub-band panels.

According to a fourth aspect of the present invention there has been provided a novel system for interpolating seismic traces, wherein the interpolation takes place within sub-band panels. In brief, the interpolation takes place in the sub-band panel domain by interpolating between adjacent sub-band traces in every sub-band panel. All of the resulting interpolated traces are then inverted to produce a single interpolated trace in the x-t domain. This embodiment is best illustrated in FIG. 6.

In more particular, let the collection of sub-band panels calculated from a spatially related group of seismic traces be denoted by the variable, $A_j(M,i)$, as explained above. The sub-band traces that define the "mth" sub-band panel are thus, $A_j(m,i)$, j=1, NG, i=1, N, wherein "m" is constant for a particular sub-band panel. Let, $T(m,i)$ be the interpolated sub-band trace in the "mth" sub-band. Further assume that it is desired to interpolate a new trace between traces "j" and "j+1" in the original gather. $T(m,i)$ might be calculated, by way of example only, as a simple average of the adjacent traces in each sub-band:

$$T(m, i) = \frac{1}{2} (A_j(m, i) + A_{j+1}(m, i)).$$

Given this collection of interpolated sub-band traces $T(m,i)$, it then becomes a simple matter to invert them using the inverse VSTFT as disclosed above:

$$t(M) = \frac{1}{L} * \frac{1}{w(L/2)} \sum_{k=0}^{L-1} T(M, k) e^{+2\pi i k n/L},$$

where $t(M)$ represents the new x-t domain interpolated seismic trace. Finally, although the interpolation method conceived by the present inventors has been illustrated herein through the use of a simple adjacent-trace averaging scheme, those skilled in the art recognize that a variety of other interpolation schemes could have been used instead: linear combinations of multiple sub-band traces, spline fits, and assorted 2-D interpolation functions are among the many that could be used.

In the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could be used to process, edit, and/or analyze multi-component seismic data, shear wave data, magneto-telluric data, cross well survey data, full waveform sonic logs, or model-based digital simulations of any of the foregoing. In short, the process disclosed herein can potentially be applied to any single geophysical time series, but it is preferably applied to a collection of spatially related time series. Thus, in the text that follows those skilled in the art will understand that "seismic trace" is used herein in a generic sense to apply to geophysical time series in general.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A computer based method of filtering geophysical time series, comprising the steps of:
   (a) obtaining a plurality of spatially related geophysical time series distributed over a pre-determined volume of the earth, said geophysical time series containing digital samples, said digital samples being characterized by a travel time, a position, and an amplitude;
   (b) transforming at least a portion of said spatially related geophysical time series using a very short time discrete orthonormal transformation, said very short time discrete orthonormal transformation producing transform coefficients;
   (c) organizing said transform coefficients into a plurality of sub-band traces;
   (d) modifying one or more of said transform coefficients within one or more of said sub-band traces; and,
   (e) inverting said sub-band traces using a very short time discrete orthonormal transform inverse, thereby producing a filtered version of said transformed portion of said spatially related geophysical time series.

2. A method according to claim 1 wherein step (d) includes the step of increasing at least one transform coefficient.

3. A method according to claim 1 wherein step (d) includes the step of decreasing at least one transform coefficient.

4. A method according to claim 1 wherein said discrete orthonormal transform is a very short time discrete Fourier transform and said transform coefficients are Fourier transform coefficients.

5. A method according to claim 1 wherein step (b) comprises the steps of:
   selecting at least one geophysical time series from said plurality of spatially related geophysical time series; and,
   applying a very short time discrete orthonormal transformation to each geophysical time series so selected, said very short time discrete orthonormal transformation
   (i) being applied to a window containing digital samples,
   (ii) being characterized by a plurality of orthonormal basis functions, and
   (iii) producing a plurality of transform coefficients associated with said orthonormal basis functions when so applied.

6. A method according to claim 5 wherein
   for each selected spatially related geophysical time series
      said very short time discrete orthonormal transformation is applied to a plurality of overlapping windows containing digital samples from said selected geophysical time series, and
      wherein each sub-band trace formed in step (c) contains transform coefficients corresponding to a same basis function.

7. A method according to claim 6 wherein a weight function is applied within each of said overlapping windows prior to transformation by said very short time discrete orthonormal transform.

8. A method according to claim 7 wherein said very short time discrete orthonormal transform is a very short time discrete Fourier transform.

9. A method according to claim 7 wherein said very short time discrete orthonormal transform is a very short time discrete local cosine transform.

10. A method according to claim 7 wherein said very short time discrete orthonormal transform is a very short time discrete local sine transform.

11. A method according to claim 8 wherein said weight function is a Gaussian weight function.

12. A method according to claim 11 wherein each of said plurality of overlapping windows has a same length measured in digital samples and said same length is about 32 digital samples long.

13. A method according to claim 1
    wherein said spatially related geophysical time series contain one or more coherent noise events and one or more of said transform coefficients corresponds to one or more of said coherent noise events, and
    wherein step (d) comprises the steps of:
       identifying one or more transform coefficients corresponding to one or more of said coherent noise events; and, modifying one or more of said transform coefficients so identified.

14. A method according to claim 13 wherein the step of modifying one or more of said transform coefficients so identified is performed by reducing in value one or more transform coefficients corresponding to one or more of said coherent noise events.

15. In a digital computer wherein seismic traces obtained over a pre-determined volume of the earth are read into memory, wherein a plurality of spatially related seismic traces are selected from said seismic traces, and wherein said digital computer is used to filter said plurality of spatially related seismic traces, a digital computer programmed to perform a process comprising the steps of:
    (a) transforming at least a portion of said plurality of spatially related seismic traces using a very short time discrete orthonormal transformation, said very short time discrete orthonormal transformation producing transform coefficients;
    (b) organizing said transform coefficients into a plurality of sub-band traces;
    (c) modifying one or more of said transform coefficients within one or more of said sub-band traces; and,
    (d) inverting said sub-band traces using a very short time discrete orthonormal transform inverse, thereby producing a filtered version of said transformed portion of said plurality of spatially related seismic traces.

16. A device adapted for use by a digital computer wherein a plurality of computer instructions defining the process of claim 15 are encoded, said device being readable by said digital computer, and said computer instructions programming said computer to perform said process.

17. The device of claim 16, wherein said device is selected from the group consisting of a magnetic tape, a magnetic disk, an optical disk and a CD-ROM.

18. A method for the generation of seismic attributes for use in the exploration of hydrocarbons, comprising the steps of:
    (a) obtaining a representation of a set of seismic traces distributed over a pre-determined volume of the earth, said seismic traces containing samples, said samples being characterized by a travel time, a position, and an amplitude;

(b) selecting a part of said volume and the seismic traces contained therein to define a region of interest within said volume;

(c) transforming at least a portion of said seismic traces within said region of interest using a very short time discrete orthonormal transformation, said very short time discrete orthonormal transformation producing transform coefficients;

(d) organizing said transform coefficients into sub-band traces; and, (e) forming, from said sub-band traces, a seismic attribute display.

19. A method according to claim 18 wherein step (d) includes the further step of organizing said sub-band traces into one or more sub-band panels.

20. A method according to claim 19 wherein step (e) includes the further step of recording visually perceptible images representative of said sub-band panels on a generally flat medium.

21. A method according to claim 20, further including the step of using said visually perceptible images to identify subsurface structural and sedimentological features commonly associated with the entrapment and storage of hydrocarbons.

22. A method according to claim 21, further including the step of using said subsurface structural and sedimentological features commonly associated with the entrapment and storage of hydrocarbons to identify a drilling prospect.

23. A method according to claim 22, further including the step of drilling a well at said identified drilling prospect.

24. A method according to claim 18, wherein step (e) includes the steps of calculating one or more seismic attributes from said transform coefficients; and, recording visually perceptible images representative of said seismic attributes on a generally flat medium.

25. A method according to claim 24 wherein said very short time discrete orthonormal transform is applied to a window containing digital samples, is characterized by a plurality of orthonormal basis functions, and produces a plurality of transform coefficients associated with said orthonormal basis functions each time it is applied, and step (c) includes the additional step of applying a weight function to said digital samples within said window prior to transformation by said very short time discrete orthonormal transform.

26. A method according to claim 25 wherein said weight function is a Gaussian weight function.

27. A method according to claim 26 wherein said discrete orthonormal transform is a very short time discrete Fourier transform and said transform coefficients are Fourier transform coefficients.

28. A method according to claim 27 wherein the step of calculating one or more seismic attributes from said transform coefficients includes the step of calculating the absolute value of said Fourier transform coefficients.

29. A method according to claim 27 wherein the step of calculating one or more seismic attributes from said transform coefficients includes the step of calculating the phase angle of said Fourier transform coefficients.

30. In a digital computer wherein seismic traces obtained over a pre-determined volume of the earth are read into memory, wherein a plurality of spatially related seismic traces are selected from said seismic traces, and wherein said digital computer is used to form a seismic attribute display from said plurality of spatially related seismic traces, a digital computer programmed to perform a process comprising the steps of:

(a) transforming at least a portion of said spatially related seismic traces using a very short time discrete orthonormal transformation, said very short time discrete orthonormal transformation producing transform coefficients;

(b) organizing said transform coefficients into sub-band traces; and, (c) forming, from said sub-band traces, a seismic attribute display.

31. A device adapted for use by a digital computer wherein a plurality of computer instructions defining the process of claim 30 are encoded, said device being readable by said digital computer, and said computer instructions programming said computer to perform said process.

32. The device of claim 31, wherein said device is selected from the group consisting of a magnetic tape, a magnetic disk, an optical disk and a CD-ROM.

33. In the exploration for hydrocarbons, a seismic attribute map prepared by a process, said process comprising the steps of:

(a) accessing by means of a computer, a dataset comprising seismic traces distributed over a pre-determined volume of the earth, said seismic traces containing digital samples, said digital samples being characterized by a travel time, a position, and an amplitude;

(b) selecting a plurality of spatially related seismic traces from said seismic signal trace dataset;

(c) calculating for at least a portion of each spatially related seismic trace so selected a very short time discrete orthonormal transform, said very short time discrete orthonormal transform producing a plurality of transform coefficients;

(d) organizing said transform coefficients into a plurality of sub-band traces;

(e) calculating a plurality of seismic attribute values from said transform coefficients;

(f) determining a position for each calculated seismic attribute value; and, (g) displaying said seismic attribute values at locations representative of said positions.

34. A device adapted for use by a digital computer wherein a plurality of computer instructions defining the process of claim 33 are encoded, said device being readable by said digital computer, and said computer instructions programming said computer to perform said process.

35. The device of claim 34, wherein said device is selected from the group consisting of a magnetic tape, a magnetic disk, an optical disk and a CD-ROM.

36. A computer based method of seismic exploration, wherein the claimed method is applied to a plurality of spatially related seismic traces containing at least one seismic reflector of interest, said spatially related seismic traces containing digital samples, said digital samples being characterized by a travel time, a position, and an amplitude, and said seismic reflector of interest being characterized by spatial variations, comprising the steps of:

(a) transforming at least a portion of said spatially related seismic traces using a very short time discrete orthonormal transformation, said very short time discrete orthonormal transformation producing transform coefficients, and a plurality of said transform coefficients corresponding to a same seismic reflector of interest;

(b) locating at least two of said transform coefficients corresponding to said same seismic reflector of interest; and, (c) analyzing for spatial variations said located transform coefficients corresponding to said same seismic reflector of interest.

37. A method according to claim 36 wherein step (c) comprises the steps of determining a position of each transform coefficient so located and recording at least one visually perceptible image representative of said located transform coefficients on a generally flat medium.

38. A method according to claim 37, further including the step of using said visually perceptible images to identify subsurface structural and sedimentological features commonly associated with the entrapment and storage of hydrocarbons.

39. A method according to claim 38, further including the step of using said subsurface structural and sedimentological features commonly associated with the entrapment and storage of hydrocarbons to identify a drilling prospect.

40. A method according to claim 39, further including the step of drilling a well at said identified drilling prospect.

41. In the exploration for hydrocarbons, wherein seismic data comprising reflected seismic energy are recorded as a function of time over a predetermined volume of the earth to produce a plurality of spatially related seismic traces, said spatially related seismic traces containing samples, said samples being characterized by a travel time, a position, and an amplitude, a map for the exploration of oil and gas produced by the process of claim 35, comprising:

(a) a generally flat medium for recording visually perceptible images thereon; and, (b) at least one visually perceptible image on said generally flat medium, said visually perceptible image representative of said located transform coefficients corresponding to said same seismic reflector of interest.

42. The process of claim 36, wherein at least step (a) is digitally encoded as a set of instructions for programming a computer and further including the step of loading said instructions on said computer before performing step (a).

43. A device adapted for use by a digital computer wherein a plurality of computer instructions defining the process of claim 42 are encoded, said device being readable by said digital computer, and said computer instructions programming said computer to perform said process.

44. The device of claim 43, wherein said device is selected from the group consisting of a magnetic tape, a magnetic disk, an optical disk and a CD-ROM.

45. A computer based method of interpolating a geophysical time series from a plurality of spatially related geophysical time series containing digital samples, comprising the steps of:

(a) obtaining a plurality of spatially related geophysical time series distributed over a pre-determined volume of the earth, said geophysical time series containing digital samples, said digital samples being characterized by a travel time, a position, and an amplitude; and, (b) selecting a part of said volume and the geophysical time series contained therein to define a region of interest within said volume;

(c) transforming at least a portion of said geophysical time series within said region of interest using a very short time discrete orthonormal transformation, said very short time discrete orthonormal transformation producing transform coefficients;

(d) organizing said transform coefficients into a plurality of sub-band traces;

(e) calculating a plurality of interpolated sub-band traces from said plurality of sub-band traces; and, (f) inverting said plurality of interpolated sub-band traces using a very short time discrete orthonormal transform inverse.

46. The process of claim 45 wherein step (d) contains the further step of forming said sub-band traces into a plurality of sub-band panels.

47. The process of claim 46 wherein step (e) comprises the steps of:

(i) selecting a sub-band panel and the sub-band traces contained therein;

(ii) calculating an interpolated sub-band trace from said sub-band traces comprising said selected sub-band panel; and, (iii) repeating steps (i) and (ii) for a plurality of said sub-band panels, thereby producing a plurality of interpolated sub-band traces.

48. The process of claim 45, wherein said process is performed on a digital computer and said steps are encoded on a medium that is readable by said computer and that instructs said computer to perform said process.

49. A medium according to claim 48 wherein said medium is selected from the group consisting of a magnetic tape, a magnetic disk, an optical disk and a CD-ROM.

50. A computer based method of identifying aberrant seismic traces, comprising the steps of:

(a) obtaining a plurality of spatially related seismic traces distributed over a pre-determined volume of the earth, said seismic traces containing digital samples, said digital samples being characterized by a travel time, a position, and an amplitude;

(b) selecting a part of said volume and the seismic traces contained therein to define a region of interest within said volume;

(c) transforming at least a portion of said seismic traces within said region of interest using a very short time discrete orthonormal transformation, said very short time discrete orthonormal transformation producing transform coefficients;

(d) organizing said transform coefficients into a plurality of sub-band traces; and, (e) determining, from said plurality of sub-band traces, if a spatially related seismic trace within said region of interest is aberrant.

51. A method according to claim 50 wherein step (e) comprises the steps of:

(i) organizing said sub-band traces into a plurality of sub-band panels;

(ii) selecting a criterion sub-band panel and the sub-band traces associated therewith;

(iii) calculating a sub-band trace editing value from at least two sub-band traces associated with said criterion sub-band panel;

(iv) selecting a maximum and a minimum allowable sub-band trace editing value; and, (v) identifying as aberrant a seismic trace within said region of interest if, for a sub-band trace computed therefrom, a sub-band trace editing value calculated therefrom exceeds said maximum allowable sub-band trace editing value or is less than said minimum allowable sub-band trace editing value.

52. A method according to claim 51 wherein step (ii) comprises the steps of:

selecting a criterion statistic;

calculating a criterion statistical value for a plurality of sub-band panels;

selecting a sub-band panel having a largest criterion statistical value calculated therefrom; and, selecting a criterion sub-band panel, said criterion sub-band panel being associated with said sub-band trace having said largest sub-band trace criterion statistical value calculated therefrom.

53. A method according to claim 52 wherein step (iii) includes the step of calculating the maximum spectral amplitude in a sub-band trace.

54. The process of claim 50, wherein at least steps (a) through (d) are digitally encoded as a set of instructions for programming a computer and further including the step of loading said instructions on said computer before performing steps (a) through (d).

55. A device adapted for use by a digital computer wherein a plurality of computer instructions defining the process of claim 54 are encoded, said device being readable by said digital computer, and said computer instructions programming said computer to perform said process.

56. The device of claim 55, wherein said device is selected from the group consisting of a magnetic tape, a magnetic disk, an optical disk and a CD-ROM.

* * * * *

UNITED STATES PATENT AND TRADEMARK OFFICE
CERTIFICATE OF CORRECTION

PATENT NO. : 5,850,622
DATED : December 15, 1998
INVENTOR(S) : Anthony A. Vassiliou, Paul Garossino It is certified that error appears in the above-identified patent and that said Letters Patent is hereby corrected as shown below:

| Col. | Line | | |
|------|------|---|---|
| 6 | 13 | "a window that so long that it" should read --a window so long that it-- | |
| 9 | 10 | "when the sub-band panel are used" should read --when the sub-band panels are used-- | |
| 11 | 6 | "observe to visually "smooth out"" should read --observer to visually "smooth out"-- | |
| 11 | 14 | "transformations that could used in exactly" should read --transformations that could be used in exactly-- | |
| 11 | 45 | "B(k;n) is inverse" should read --B(k;n) is the inverse-- | |
| 14 | 41 | "will be found at the precisely the" should read --will be found at precisely the-- | |
| 15 | 13 | "the value of M the upper" should read --the value of M, the upper-- | |

UNITED STATES PATENT AND TRADEMARK OFFICE
CERTIFICATE OF CORRECTION

PATENT NO. : 5,850,622
DATED : December 15, 1998
INVENTOR(S) : Anthony A. Vassiliou, Paul Garossino It is certified that error appears in the above-identified patent and that said Letters Patent is hereby corrected as shown below:

| Col. | Line | | |
|------|------|---|---|
| 15 | 64 | "$\sigma_2 = 2\sigma^2{}_1,$" should read -- $\sigma_2 = 2\sigma^2_1,$ -- | |

Signed and Sealed this

Fifteenth Day of June, 1999

Attest:

Q. TODD DICKINSON

Attesting Officer

Acting Commissioner of Patents and Trademarks